United States Patent
Russell

(10) Patent No.: US 8,973,001 B2
(45) Date of Patent: Mar. 3, 2015

(54) PROCESSING TRANSACTION REQUESTS USING A LOAD BALANCING UTILITY AND MULTIPLE OPERATING PARAMETERS

(75) Inventor: Wayne Russell, Graham, NC (US)

(73) Assignee: Bank of America Corporation, Charlotte, NC (US)

( * ) Notice: Subject to any disclaimer, the term of this patent is extended or adjusted under 35 U.S.C. 154(b) by 316 days.

(21) Appl. No.: 13/348,096

(22) Filed: Jan. 11, 2012

(65) Prior Publication Data

US 2013/0179888 A1  Jul. 11, 2013

(51) Int. Cl.
- *G06F 9/46* (2006.01)
- *G06F 15/16* (2006.01)
- *G06F 15/173* (2006.01)
- *G06Q 10/00* (2012.01)

(52) U.S. Cl.
USPC ........... 718/101; 718/105; 718/102; 718/100; 709/235; 709/238; 705/7.26

(58) Field of Classification Search
None
See application file for complete search history.

(56) References Cited

U.S. PATENT DOCUMENTS

| | | | |
|---|---|---|---|
| 6,505,250 B2 | 1/2003 | Freund et al. | |
| 7,653,741 B2 * | 1/2010 | Mazzitelli | 709/235 |
| 7,653,905 B1 * | 1/2010 | Lingamneni | 718/100 |
| 2010/0312883 A1 | 12/2010 | Winn et al. | |

OTHER PUBLICATIONS

International Search Report and Written Opinion dated Mar. 18, 2013 in International Application No. PCT/US13/20456.

* cited by examiner

*Primary Examiner* — Mengyao Zhe
*Assistant Examiner* — Bing Zhao
(74) *Attorney, Agent, or Firm* — Banner & Witcoff, Ltd.; Michael A. Springs

(57) ABSTRACT

Methods, computer readable media, and apparatuses for balancing the number of transaction requests with the number of applications running and processing information for those transaction requests are presented. According to one or more aspects, a message queue receives one or more messages, each including a transaction request, from a computing device. The message queue sends a trigger message to a trigger queue. The load balancing utility monitors the number of messages in the message queue and determines a number of transaction requests to process and starts a number of additional applications to process the additional transaction requests. The applications process the transaction requests and send a response for each of the transaction requests to the message queue. The message queue sends the response back to the computing device.

15 Claims, 5 Drawing Sheets

PROCESSING TRANSACTION REQUESTS USING A LOAD BALANCING UTILITY AND MULTIPLE OPERATING PARAMETERS

FIELD OF THE INVENTION

One or more aspects of the disclosure generally relate to computing devices, computing systems, and computer software. In particular, one or more aspects of the disclosure generally relate to computing devices, computing systems, and computer software that may be used by an organization to balance the number of transaction requests with the number of applications running and processing information for the transaction requests.

BACKGROUND OF THE INVENTION

Currently, computer programs that balance the number of transaction requests and the number of applications processing information for those transaction requests exist. However, the current programs have drawbacks. For example, the current programs require many different applications to monitor the number of transaction requests and either start one application that processes every transaction request at the same time or start a different application for every transaction request received. In the first instance, if a large number of transaction requests are received and processed at the same time, the delay in obtaining a response to the transaction request may be large. In the second instance, if a large number of transaction requests are received, starting the required number of applications may overload a system. Aspects of the disclosure provide a more efficient way of monitoring the number of transaction requests and balancing the number of applications processing information for those transaction requests.

BRIEF SUMMARY OF THE INVENTION

The present invention provides a load balancing system for balancing the number of transaction requests and the number of applications processing information relating to the transaction requests. The load balancing system may include a number of components, including a message queue ("MQ"), with an associated trigger queue, a load balancing utility ("LBU"), a parameter file, applications, a journal, and a customer information control system ("CICS") recorder. In the load balancing system, the message queue may receive one or more messages from one or more computing devices, such as personal computers or automated teller machines. The messages may include one or more transaction requests. The transaction request may be any type of request for information. A message arriving on the message queue may send one or more trigger messages to the trigger queue, which may send a message to the LBU instructing the LBU to monitor the message queue. The LBU may then monitor the number of messages received at the message queue. Based on the number of messages in the message queue, the LBU may trigger or start applications to process the transaction requests contained in the messages in the message queue. The applications query information relating to the transaction request and analyze that information to determine one or more responses to the transaction requests. The applications may send the responses to the message queue, which in turn, sends the responses to one or more computing devices. The LBU may monitor and report the operations of the load balancing system to the journal. The CICS recorder may record the operations and activities within the load balancing system.

The present invention also includes a method for balancing the number of transaction requests and the number of applications processing information relating to the transaction requests. The method may include one or more of the following steps: receiving one or more messages that includes one or more transaction requests, sending a trigger message to a trigger queue, sending a message to a LBU, monitoring the number of messages in the message queue, determining a number of transaction requests to process, determining the number of transaction requests currently processing on the system, starting one or more applications to process the transaction requests contained in the message, processing the transaction requests, sending a response to the transaction request, and determining if additional transaction requests need to be processed.

DETAILED DESCRIPTION OF THE INVENTION

Figure 1A:
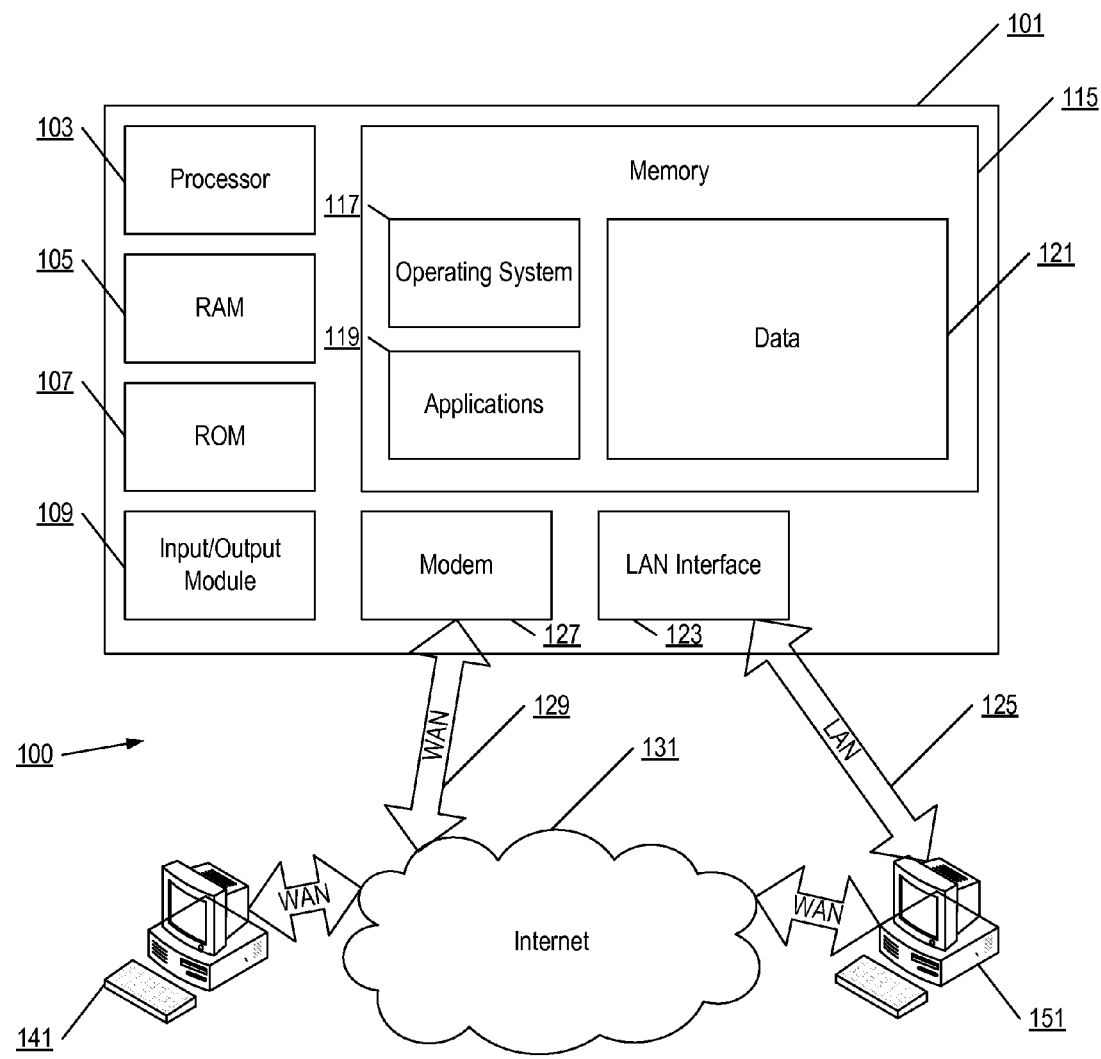
FIG. 1A illustrates an example operating environment in which various aspects of the disclosure may be implemented.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized, and that structural and functional modifications may be made, without departing from the scope of the present claimed subject matter.

FIG. 1A illustrates an example block diagram of a generic computing device 101 (e.g., a computer server) in an example computing environment 100 that may be used according to one or more illustrative embodiments of the disclosure. The generic computing device 101 may have a processor 103 for controlling overall operation of the server and its associated components, including random access memory (RAM) 105, read-only memory (ROM) 107, input/output (I/O) module 109, and memory 115.

I/O module 109 may include a microphone, mobile device, mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling generic computing device 101 to perform various functions. For example, memory 115 may store software used by the generic computing device 101, such as an operating system 117, application programs 119, and an associated database 121. Alternatively, some or all of the computer executable instructions for generic computing device 101 may be embodied in hardware or firmware (not shown).

The generic computing device 101 may operate in a networked environment supporting connections to one or more remote computers, such as terminals 141 and 151. The terminals 141 and 151 may be personal computers or servers that include many or all of the elements described above with respect to the generic computing device 101. The network connections depicted in FIG. 1A include a local area network (LAN) 125 and a wide area network (WAN) 129, but may also include other networks. When used in a LAN networking environment, the generic computing device 101 may be connected to the LAN 125 through a network interface or adapter 123. When used in a WAN networking environment, the generic computing device 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed. Generic computing device 101 and/or terminals 141 or 151 may also be mobile terminals (e.g., mobile phones, smartphones, PDAs, notebooks, and the like) including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 1B:
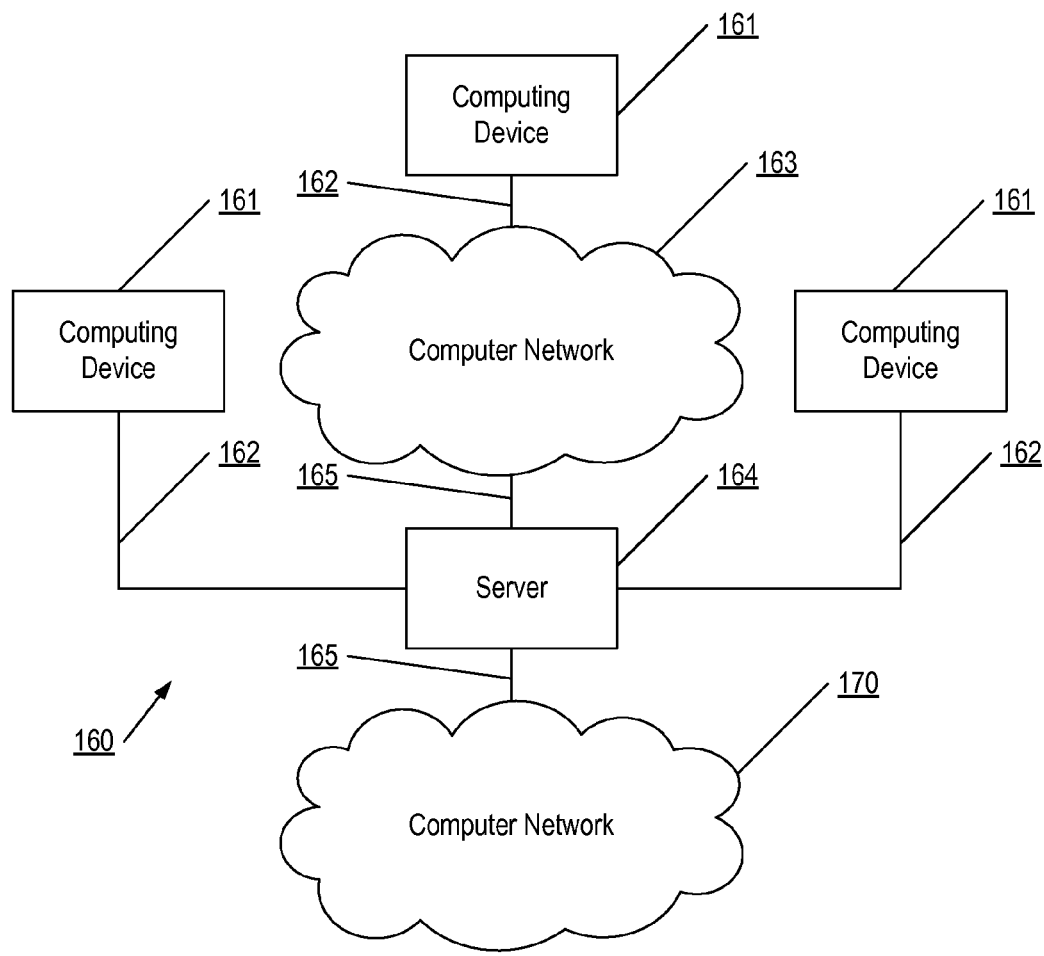
FIG. 1B illustrates another example operating environment in which various aspects of the disclosure may be implemented.

FIG. 1B illustrates another example operating environment in which various aspects of the disclosure may be implemented. As illustrated, system 160 may include one or more computing devices 161. Computing devices 161 may, in some examples, be connected by one or more communications links 162 to computer network 163 that may be linked via communications links 165 to server 164. In system 160, server 164 may be any suitable server, processor, computer, or data processing device, or combination of the same. Server 164 may be used to process the instructions received from, and the transactions entered into by, one or more participants.

According to one or more aspects, system 160 may be associated with a financial institution, such as a bank. Various elements may be located within the financial institution and/or may be located remotely from the financial institution. For instance, one or more computing devices 161 may be located at or within a branch office of a financial institution. Such computing devices may be used, for example, by customer service representatives, other employees, and/or customers of the financial institution in conducting financial transactions via network 163. Additionally or alternatively, one or more computing devices 161 may be located at a user location (e.g., a customer's home or office). Such computing devices also may be used, for example, by customers of the financial institution in conducting financial transactions via computer network 163 or computer network 170. The computing devices may be any type of computing device, including computers, servers, mobile devices, and automated teller machines.

Computer network 163 and computer network 170 may be any suitable computer networks including the Internet, an intranet, a wide-area network (WAN), a local-area network (LAN), a wireless network, a digital subscriber line (DSL) network, a frame relay network, an asynchronous transfer mode network, a virtual private network (VPN), or any combination of any of the same. Communications links 162 and 165 may be any communications links suitable for communicating between computing devices 161 and server 164, such as network links, dial-up links, wireless links, hard-wired links, and the like.

Figure 2:
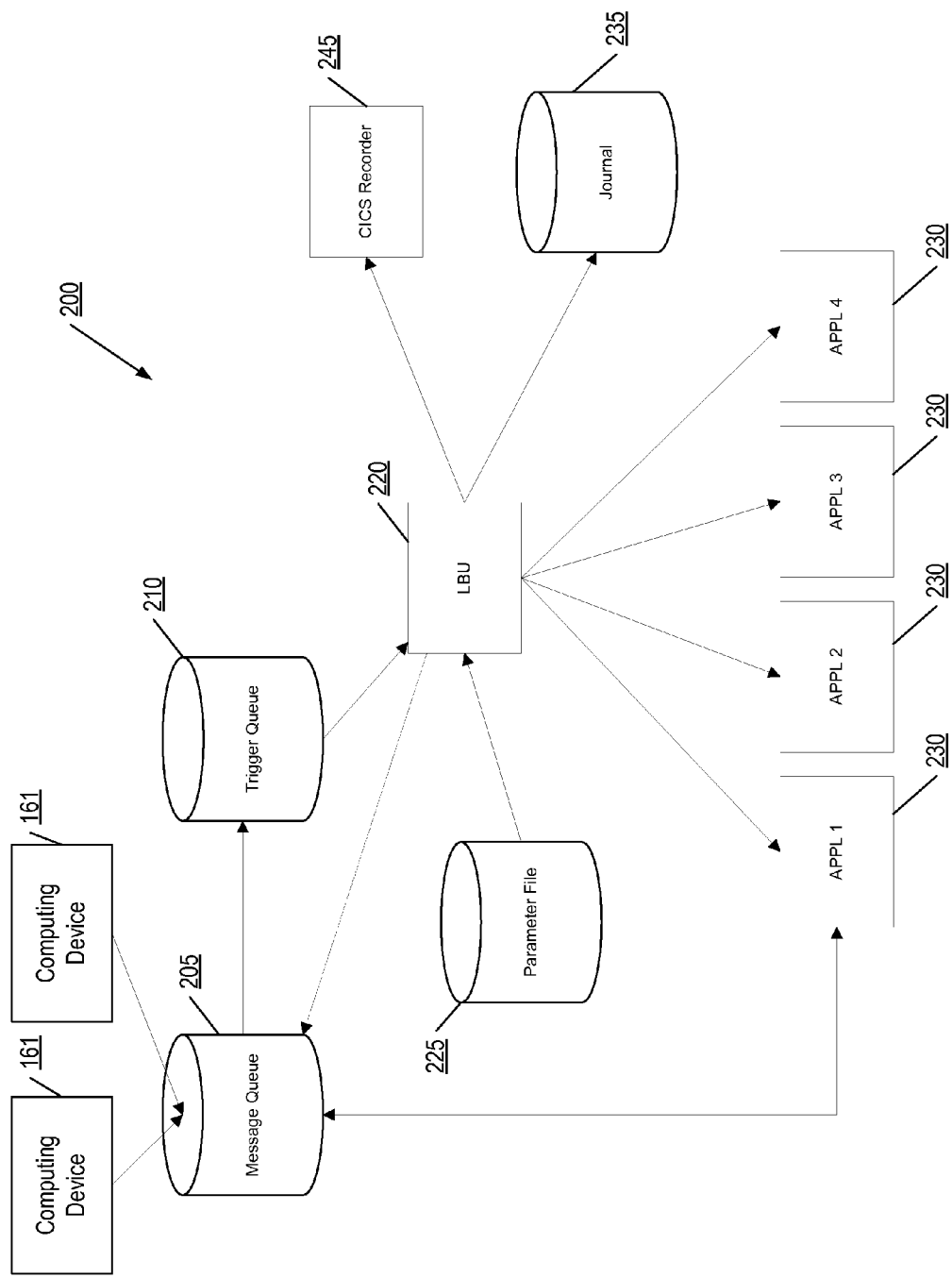
FIG. 2 illustrates an example load balancing system according to one or more illustrative aspects described herein.

FIG. 2 illustrates a load balancing system 200. The load balancing system 200 may include any number of components. For example, the load balancing system 200 may include a message queue 205, a trigger queue 210, a load balancing utility ("LBU") 220, a parameter file 225, applications 230, a journal 235, and a customer information control system ("CICS") recorder 245. One or more of these components may be optional in the load balancing system 200. The components may all be located on the same server or computer system, or one or more components may be located on a separate server or computer system.

The load balancing system 200 monitors messages sent to the system 200 from one or more computing devices 161 to the message queue 205 and maintains a balance between the number of messages received and the number of transaction requests being processed within the system 200. The load balancing system 200 balances the number of messages by starting applications 230 as necessary to complete transaction requests contained in the received messages. The applications may be any type of application or software program in a business that is configured to process information. For example, the applications 230 may process information relating to balance inquiries or financial transactions, such as withdrawals, or transfers of money between accounts. Additionally, the applications 230 may process information relating to any transaction conducted on the financial institution's website or a request to forward or store information in a specific location, such as an account ledger. In at least one embodiment, the applications 230 may be different types of applications or software programs that process information. Alternatively, the applications 230 may all be the same type of application or software program. In at least one embodiment, messages are sent from one or more computing device, such as the computing devices 161 illustrated in FIG. 1B, to a message queue 205, as illustrated in FIG. 2. Messages can be initiated from any type of computing device 161, such as a computer, a mobile device, a server, a program running on a computing device or accessed through the internet or an intranet, or an automated teller machine.

The messages may include one or more transaction requests for any type of information. For example, if the load balancing system 200 is being used in a financial institution, the messages may include transaction requests for balance inquiries or for financial transactions, such as a withdrawal, or a transfer of money between accounts. Additionally, the transaction requests may be for any transaction conducted on the financial institution's website or a request to forward or store information in a specific location, such as an account ledger. The message may also include any additional information. For example, the message may include information relating to the processing of a transaction or instructions relating to the response, such as a location to send the response.

When messages are sent to the load balancing system 200, the messages are sent to the message queue 205. When the message queue 205 receives one or more messages from a computing device 161, the message queue 205 sends a trigger message to the trigger queue 210. The number of trigger messages sent may correspond to the number of messages received by the message queue 205. Alternatively, the message queue 205 will send one trigger message to the trigger queue 210 that corresponds to a plurality of messages received at the message queue 205. The plurality of messages received at the message queue 205 may be any number of messages, such as 5, 10, 30, and the like. When the trigger queue 210 receives a message, the trigger queue 210 sends a message to the LBU 220 instructing the LBU 220 to monitor the message queue 205. Once a message has been received on the trigger queue 210, the LBU 200 may monitor the message queue 205 at any interval. For example, the LBU 200 may monitor the message queue 205 continuously or may monitor the message queue 205 at a set interval, such as every 1 or 5 seconds. In at least one embodiment, the LBU 220 may monitor any queue within the load balancing system 200. For example, the LBU 220 may monitor the trigger queue 210 and/or the message queue 205. Additionally, the LBU 220 may monitor queues within any number of computer systems. For example, one LBU 220 may monitor several different message queues 205 and trigger queues 210, each located in a different computer system.

After the LBU 220 determines that messages exist in the message queue 205, the LBU 220 determines how many transaction requests are currently processing on applications 230. The LBU 220 then analyzes the messages in the message queue 205 and determines how many additional transaction requests to process. The transaction requests may be processed on applications 230. The LBU 220 may trigger the applications 230, which processes any number of transaction requests on any number of applications 230. For example, each transaction request may be processed on a different application 230. Alternatively, multiple transaction requests may be processed on a single application 230. Any number of transaction requests may be processed on a single application 230 at one time. For example, 2, 5 or 10 transaction requests may be processed on a single application 230 at the same time. The transaction requests may be processed on an application 230 simultaneously or sequentially. To process the transaction requests, the applications 230 may access databases or files containing information relating to the transaction requests. The files and databases may be located on the same server or computer system as the LBU 200 or a different server or computer system within an entity. Transaction requests may also be processed by applications 230 without the LBU 220 triggering the applications 230.

The LBU 220 may include operating parameters that control the operation of the LBU 220. The operating parameters may be stored in parameter file 225. The parameter file 225 may be stored separately from the LBU 220 or stored internally in the LBU 220. Any type of parameters may be included in the parameter file 225. In at least one embodiment, the operating parameters set a maximum number of transaction requests that can be processed at one time. The maximum number of transaction requests that can be processed at one time may be any number of transaction requests, and may be dependent on the number of applications 230 within the load balancing system 200. For example, the maximum number of transaction requests that can be processed at a single time may be 30 or 100 or some other number. In at least one embodiment, the number of transaction requests processed may be a percentage of the number of messages in the message queue205, such that the number of transaction requests initiated by the LBU 220 does not exceed the maximum number of transaction requests allowed to be processed at a single time. Once an application 230 has started processing transaction requests, the application 230 will continue processing transaction requests with or without the LBU 220 triggering the application 230 to process additional transaction requests.

The operating parameters may also include rules determining when transaction requests may be processed. For example, the operating parameters may set a one second delay between the processing of each of the transaction requests. In this embodiment, if the LBU 220 is going to process ten transaction requests, the ten transaction requests may each start processing one second apart from each other. Alternatively, the operating parameters may allow the ten transaction requests to process simultaneously, but may require additional transaction requests to start processing one second after the first ten transaction requests have started processing. The operating parameters may also include rules that determine when and how often the LBU 220 monitors the trigger messages.

As an illustrative example, the message queue 205 may receive 100 messages, each containing a transaction request. The message queue 205 may send a trigger message to the trigger queue 210 and the trigger queue 210 may send an instruction to the LBU 220 to monitor the message queue 205. In this example, the LBU 220 may have operating parameters that allow the LBU 220 to process transaction requests for 10% of the messages contained in the message queue 205, but not to exceed 36 total transaction requests processing at one time. In this example, the LBU 220 may process 10 transaction requests if 100 messages were in the message queue 205. The LBU 220 may also have operating parameters for the LBU 220 to monitor the number of messages in the message queue 205 every second. The LBU 220 determines the number of transaction requests currently processing on applications 230. If less than 26 transaction requests are currently processing the LBU 220 will process 10 additional transaction requests. If more than 26 transaction requests are currently processing, the LBU 220 will initiate and process as many transaction requests as possible, not to exceed a total of 36 transaction requests processing at the same time.

One second later, the LBU 220 checks the number of messages in the message queue 205, and it has decreased to 40 messages, because additional transaction requests were processed by applications 230 during the one second time interval. The LBU 220 determines the number of transaction requests currently processing and initiates the processing of 4 additional transaction requests (10% of the messages in the message queue 205) as long as the total number of transaction requests processing at once does not exceed 36. If 33 transaction requests were processing at this time, the LBU 220 would only process 3 additional transaction requests in order to remain below the predetermined threshold number of transaction requests processing at one time. This process is repeated as necessary to balance the number of messages within the message queue 205 with the number of applications 230 processing the transaction requests.

Figure 3:
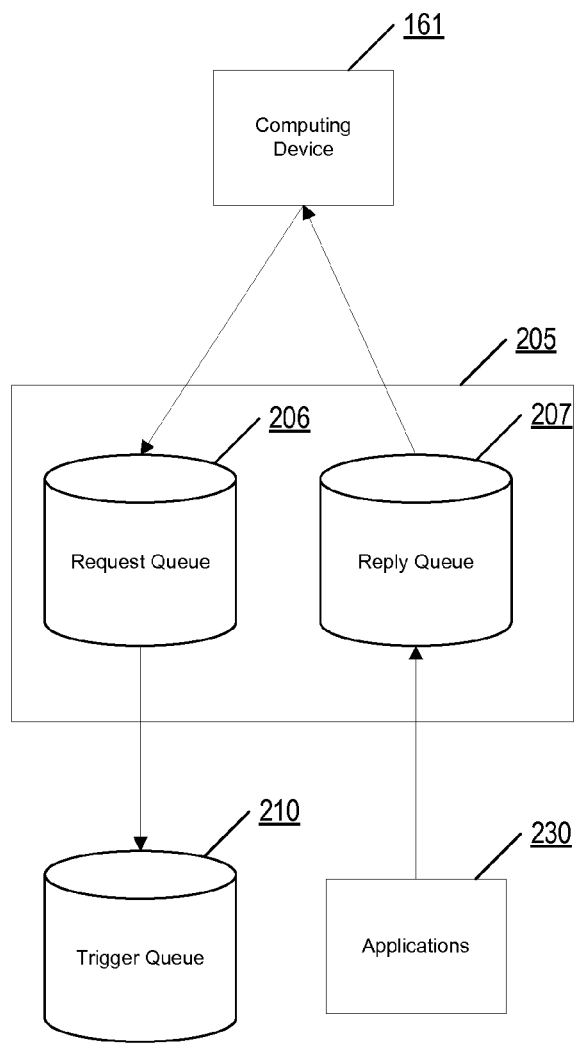
FIG. 3 illustrates an example message queue within a load balancing system according to one or more illustrative aspects described herein.

When the applications 230 are initiated or triggered, the applications 230 read the messages in the message queue 205 and analyze the information contained in the messages. The messages may include transaction requests that require the applications 230 to query a database or file containing information responsive to the transaction request. For example, if the transaction request is for a balance inquiry, files or databases containing customer balances may be accessed. The applications 230 process the information from the databases or files, determine a response to the transaction request, and report the response back to the message queue 205. The message queue 205 then reports the response back to one or more computing device 161. As illustrated in FIG. 3, the message queue 205 may contain a request queue 206 and a reply queue 207. In this embodiment, the computing device 161 sends a message containing a transaction request to the request queue 206. After the applications 230 process the transaction, the applications 230 send a response message to the reply queue 207, which sends the response back to the computing device 161.

Referring back to FIG. 2, The LBU 220 may also provide reporting, messaging and monitoring functions. The LBU 220 may monitor all of the queues within the load balancing system 200. For example, the LBU 220 may monitor the number of messages in the message queue 205 and if the number of messages in the message queue 205 has reached a predetermined threshold or if the applications 230 are not processing messages correctly, the LBU 220 may report these issues. In at least one embodiment, the LBU 220 reports an issue if the message queue 205 exceeds a predetermined number of messages for a specified amount of time. For example, if the message queue 205 exceeds the predetermined number of messages for three consecutive checks by the LBU 220, the LBU 220 will send a message to notify the appropriate personnel.

Additionally, the LBU 220 may monitor whether or not specific transaction requests are processed on applications 230. If transaction requests are not processed on the applications 230, the LBU 220 may report this issue. The LBU 220 may report the issues to another computing system or directly to personnel that can manually intervene to fix the issues. In at least one embodiment, the LBU 220 may send an email to specific personnel that can intervene and fix issues within the load balancing system 200. Alternatively the LBU 220 may generate a message that is displayed on a user interface. The user interface may be located within the load balancing system 200 or may be external to the load balancing system 200.

The number of messages received by or within the message queue 205 and the trigger queue 210 and the number of transaction requests processed may be recorded by the CICS recorder 245. The CICS recorder 245 may be accessed by personnel at any time to determine how the LBU 220 is processing messages. The CICS recorder 245 may be accessed in any way, including through an interface within the load balancing system 200 or through a website. The CICS recorder 245 may provide real time data in any appropriate format, including tabular or graphical format. The CICS recorder 245 may store the recorded information in memory within the load balancing system 200. The LBU 220 may also output information to a journal 235. The journal 235 may be separate from the LBU 220. The journal may remove the information recorded by the CICS recorder 245 from the memory within the load balancing system 200 and store the information on a remote server or hard drive. The journal 235 may contain statistics and trends from the activity within the load balancing system 200. The journal 235 may be used for debugging purposes and may contain specific information including dates and times of events, the number of messages received at the message queue 205, the number of trigger messages received at the trigger queue 210, the number of applications 230 started by the LBU 220, and the operating parameters, and the like.

In at least one embodiment, the queues contained in the load balancing system 200 may be monitored from a workstation such as a computer. The queues may be monitored by any user of the load balancing system 200. The workstation may be located within a certain proximity of the load balancing system 200 or may be accessed via an intranet or the internet.

Figure 4:
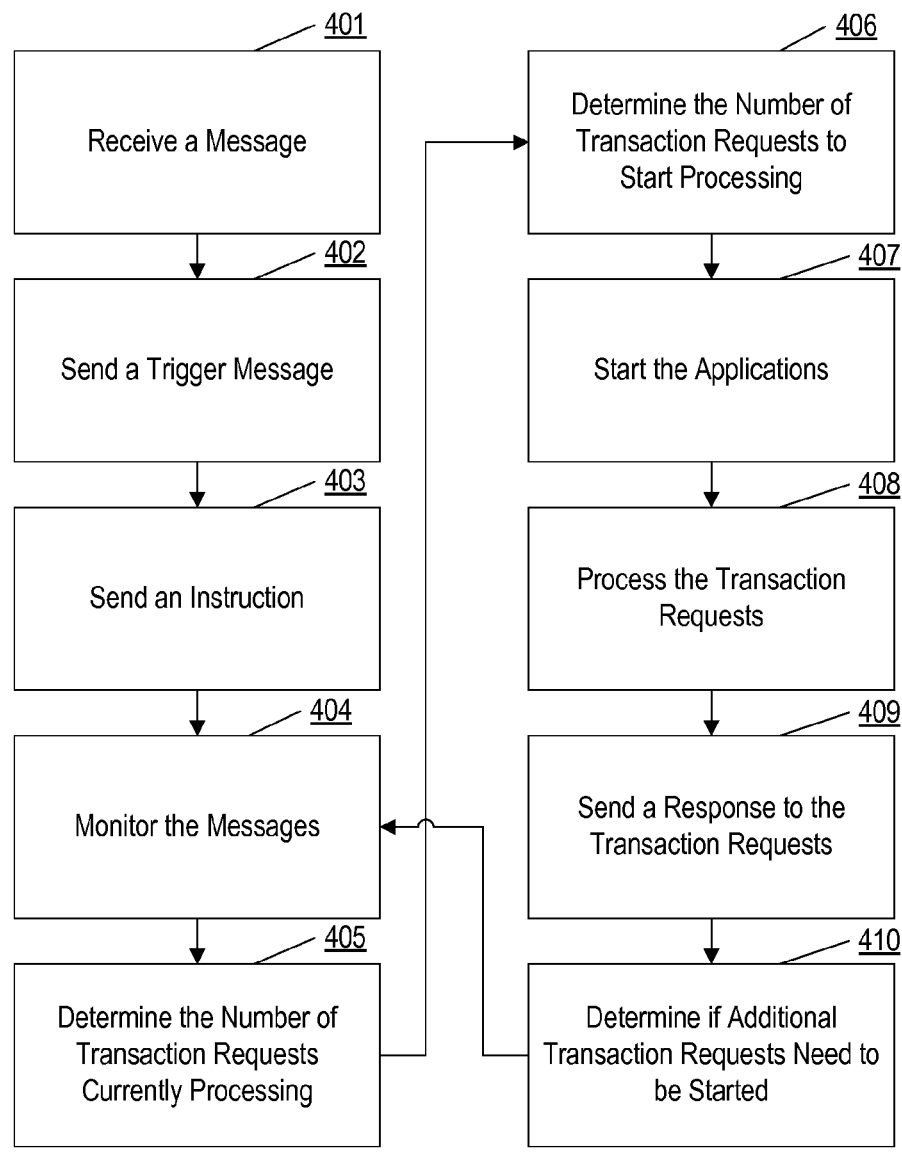
FIG. 4 illustrates an example method of balancing messages and transaction requests being processed within a load balancing system according to one or more illustrative aspects described herein.

FIG. 4 illustrates an example method of balancing messages and transaction requests processed in a load balancing system 200, according to one or more illustrative aspects described herein. According to one or more aspects, any and/or all of the methods described herein may be implemented by software executed on one or more computers, such as the generic computing device 101 of FIG. 1A, and/or by a computing system, such as system 160 of FIG. 1B. In some arrangements, the methods described herein may be performed by and/or in combination with a server (e.g., server 164). Additionally or alternatively, the methods described herein may be performed by and/or in combination with one or more computing devices (e.g., computing devices 161).

As illustrated in step 401, the message queue 205 receives one or more messages containing a transaction request. The messages may be sent from one or more computing devices 161, such as a personal computer or an automatic teller machine. In step 402, the message queue 205 sends a trigger message to the trigger queue 210 notifying the trigger queue 210 that one or more messages have been received at the message queue 205. In step 403, the trigger queue 210 may send a message or an instruction to the LBU 220 to monitor the message queue 205. In step 404, the number of messages in the message queue 205 is monitored by the LBU 220. In this embodiment, the trigger messages correspond to one or more messages that have been received at the message queue 205.

In step 405, the LBU 220 determines the number of transaction requests currently being processed on applications 230. Next, based on the number of messages within the message queue 205, the LBU 220 determines the number of transaction requests to start processing, as illustrated in step 406. The number of transaction requests to start processing may be based on any number of factors, such as the number of messages in the message queue 205, the number of applications 230 that are available, or the operating parameters in parameter file 225.

As illustrated in step 407, once the number of transaction requests to start processing has been determined, the LBU 220 starts processing the required number of transaction requests on applications 230, as long as the total number of transaction requests currently processing and the number of transaction requests to start processing does not exceed a predetermined threshold number of transaction requests allowed to process at a single time. The predetermined threshold number of transaction requests that the LBU 220 is allowed to process at one time may be specified in the parameter file 225.

In step 408, one or more applications 230 process the transaction requests contained in the messages received at the message queue 205. The applications 230 may process the transaction requests by querying databases or files with information relating to the transaction requests, analyzing the information from the databases or files, and determining an appropriate response to each of the transaction requests. In step 409, the applications 230 send the response(s) to the message queue 205, which in turn, sends the response(s) to the computing devices 161.

In step 410, the LBU 220 determines if additional transaction requests need to be processed. The LBU 220 determines if additional transaction requests need to be processed by monitoring the number of messages in the message queue 205, as illustrated in steps 404. If additional transaction requests need to be processed, steps 405-409 are repeated. The LBU 220 continues to monitor the messages in the message queue 205 and start the appropriate number of applications 230. While the load balancing system 200 is active, the LBU 220 continues to monitor the trigger messages in the message queue 205.

As discussed above, the LBU 220 may report the operations of the load balancing system 200 to a journal 235. Additionally the CICS reporter 245 may monitor the processes running on the load balancing system 200.

Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

What is claimed is:

1. A load balancing system, comprising:
   at least one processor; and
   memory storing computer-readable instructions that, when executed by the at least one processor, cause the load balancing system to:
   receive, at a message queue provided by the load balancing system, one or more messages, each message of the one or more messages including one or more transaction requests;
   send, by the load balancing system, from the message queue, a trigger message to a trigger queue provided by the load balancing system, the trigger message including information associated with the one or more received messages, and the trigger message being configured to cause a load balancing utility included in the load balancing system to monitor the message queue;
   based on the trigger message being sent to the trigger queue, send, from the trigger queue and to the load balancing utility, a message instructing the load balancing utility to monitor the message queue at a set time interval, wherein monitoring the message queue includes:
   determining, by the load balancing utility, a first number of transaction requests currently being processed by one or more applications and a second number of transaction requests associated with the one or more messages in the message queue that have yet to be processed by the one or more applications;
   based on the first number, the second number, and two or more operating parameters for the load balancing utility, initiate, by the load balancing utility, at least one application to process at least one transaction request of the transaction requests associated with the one or more messages in the message queue that have yet to be processed;
   cause, by the load balancing system, the at least one initiated application to process the at least one transaction request and determine a response to the at least one transaction request;
   receive, at the message queue, the response to the at least one transaction request; and
   send, by the load balancing system, from the message queue, the response to the at least one transaction request to one or more remote computing devices,
   wherein the two or more operating parameters for the load balancing utility include at least one parameter defining, as a predetermined percentage of a total number of messages currently included in the message queue, a maximum number of not yet processed transaction requests that can be initiated for processing at the time of the monitoring, and at least one additional parameter defining a maximum threshold number of a total number of transaction requests that are allowed to be processing at the time of the monitoring.

2. The load balancing system of claim 1, wherein at least one of the one or more remote computing devices is an automatic teller machine.

3. The load balancing system of claim 1, wherein at least one transaction request of the one or more transaction requests is a request for an account balance.

4. The load balancing system of claim 1, wherein at least one application of the one or more applications is configured to process a plurality of transaction requests at a single time.

5. The load balancing system of claim 1, wherein the memory stores additional computer-readable instructions that, when executed by the at least one processor, further cause the load balancing system to:
   query one or more databases that include information relating to the at least one transaction request.

6. The load balancing system of claim 1, wherein the two or more operating parameters for the load balancing utility include one or more rules that set a delay between processing each transaction request of the one or more transaction requests.

7. The load balancing system of claim 1, wherein the load balancing utility is configured to report an issue by sending a notification message to one or more personnel if a number of messages in the message queue exceeds a predetermined threshold number of messages for a specific amount of time.

8. A method, comprising:
   receiving, at a message queue provided by a load balancing system, one or more messages, each message of the one or more messages including one or more transaction requests;
   sending, by the load balancing system, from the message queue, a trigger message to a trigger queue provided by the load balancing system, the trigger message including information associated with the one or more received messages, and the trigger message being configured to cause a load balancing utility included in the load balancing system to monitor the message queue;
   based on the trigger message being sent to the trigger queue, sending, from the trigger queue and to the load balancing utility, a message instructing the load balancing utility to monitor the message queue at a set time interval, wherein monitoring the message queue includes:
   determining, by the load balancing utility, a first number of transaction requests currently being processed by one or more applications and a second number of transaction requests associated with the one or more messages in the message queue that have yet to be processed by the one or more applications;

based on the first number, the second number, and two or more operating parameters for the load balancing utility, initiating, by the load balancing utility, at least one application to process at least one transaction request of the transaction requests associated with the one or more messages in the message queue that have yet to be processed;

processing, by the at least one initiated application, the at least one transaction request;

determining, by the at least one initiated application, a response to the at least one transaction request;

receiving, at the message queue, the response to the at least one transaction request; and sending, by the load balancing system, from the message queue, the response to the at least one transaction request to one or more remote computing devices, wherein the two or more operating parameters for the load balancing utility include at least one parameter defining, as a predetermined percentage of a total number of messages currently included in the message queue, a maximum number of not yet processed transaction requests that can be initiated for processing at the time of the monitoring, and at least one additional parameter defining a maximum threshold number of a total number of transaction requests that are allowed to be processing at the time of the monitoring.

9. The method of claim 8, wherein processing the at least one transaction request includes:
    querying one or more databases containing data relating to the at least one transaction request.

10. The method of claim 8, wherein at least one of the one or more remote computing devices is an automatic teller machine.

11. The method of claim 8, wherein at least one transaction request of the one or more transaction requests is a request for an account balance.

12. The method of claim 8, wherein at least one application of the one or more applications is configured to process a plurality of transaction requests at a single time.

13. At least one non-transitory computer-readable medium having computer-executable instructions stored thereon that, when executed, cause a load balancing system that includes at least one processor and memory to:
    receive, at a message queue provided by the load balancing system, one or more messages, each message of the one or more messages including one or more transaction requests;
    send, by the load balancing system, from the message queue, a trigger message to a trigger queue provided by the load balancing system, the trigger message including information associated with the one or more received messages, and the trigger message being configured to cause a load balancing utility included in the load balancing system to monitor the message queue;
    based on the trigger message being sent to the trigger queue, send, from the trigger queue and to the load balancing utility, a message instructing the load balancing utility to monitor the message queue at a set time interval, wherein monitoring the message queue includes:
        determining, by the load balancing utility, a first number of transaction requests currently being processed by one or more applications and a second number of transaction requests associated with the one or more messages in the message queue that have yet to be processed by the one or more applications;
    based on the first number, the second number, and two or more operating parameters for the load balancing utility, initiate, by the load balancing utility, at least one application to process at least one transaction request of the transaction requests associated with the one or more messages in the message queue that have yet to be processed;
    cause, by the load balancing system, the at least one initiated application to process the at least one transaction request and determine a response to the at least one transaction request;
    receive, at the message queue, the response to the at least one transaction request; and
    send, by the load balancing system, from the message queue, the response to the at least one transaction request to one or more remote computing devices,
    wherein the two or more operating parameters for the load balancing utility include at least one parameter defining, as a predetermined percentage of a total number of messages currently included in the message queue, a maximum number of not yet processed transaction requests that can be initiated for processing at the time of the monitoring, and at least one additional parameter defining a maximum threshold number of a total number of transaction requests that are allowed to be processing at the time of the monitoring.

14. The at least one non-transitory computer-readable medium of claim 13, wherein at least one of the one or more remote computing devices is an automatic teller machine.

15. The at least one non-transitory computer-readable medium of claim 13, wherein at least one application of the one or more applications is configured to process a plurality of transaction requests at a single time.

* * * * *